United States Patent
Oh

(10) Patent No.: US 12,162,982 B2
(45) Date of Patent: Dec. 10, 2024

(54) HIGHLY BIO-BASED POLYCARBONATE ESTER AND METHOD FOR PRODUCING SAME

(71) Applicant: SK CHEMICALS CO., LTD., Seongnam-si (KR)

(72) Inventor: Kwang Sei Oh, Seongnam-si (KR)

(73) Assignee: SK CHEMICALS CO., LTD., Seongnam-si (KR)

( * ) Notice: Subject to any disclaimer, the term of this patent is extended or adjusted under 35 U.S.C. 154(b) by 707 days.

(21) Appl. No.: 17/287,710

(22) PCT Filed: Sep. 26, 2019

(86) PCT No.: PCT/KR2019/012505
§ 371 (c)(1),
(2) Date: Apr. 22, 2021

(87) PCT Pub. No.: WO2020/085662
PCT Pub. Date: Apr. 30, 2020

(65) Prior Publication Data
US 2021/0380760 A1  Dec. 9, 2021

(30) Foreign Application Priority Data
Oct. 26, 2018  (KR) .................. 10-2018-0129022

(51) Int. Cl.
| C08G 63/42 | (2006.01) |
| C08G 63/64 | (2006.01) |
| C08G 63/672 | (2006.01) |
| C08G 64/02 | (2006.01) |

(52) U.S. Cl.
CPC .......... *C08G 63/64* (2013.01); *C08G 63/42* (2013.01); *C08G 63/672* (2013.01); *C08G 64/0208* (2013.01)

(58) Field of Classification Search
USPC ........................................................ 528/190
See application file for complete search history.

(56) References Cited

U.S. PATENT DOCUMENTS 10,266,646 B2   4/2019  Mehta

FOREIGN PATENT DOCUMENTS

| CN | 104031249 A | 9/2014 |
| EP | 2 857 433 A1 | 4/2015 |
| KR | 2015-0012152 A | 2/2015 |
| KR | 2016-0090703 A | 8/2016 |
| KR | 2019-0037098 A | 4/2019 |

OTHER PUBLICATIONS

Long Feng et al. Polymer Chemistry , 2015, vol. 6 p. 7470; Royal Society of Chemistry. (Year: 2015).*
Feng et al., "A designed synthetic strategy toward poly(isosorbide terephthalate) copolymers: a combination of temporary modification, transesterification, cyclization and polycondensation", Polymer Chemistry, (2015), vol. 6, pp. 7470-7479.
International Application No. PCT/KR2019/012505, International Search Report mailed Jan. 7, 2020, 5 pages.
Shen et al., "Synthesis technology of polyisosorbide carbonate", Modern Chemical Industry, vol. 37, (Aug. 2017) pp. 158-161.
First Office Action for Chinese Patent Application No. 201980070122.9 dated Aug. 5, 2022, 8 pages.

* cited by examiner

*Primary Examiner* — Terressa Boykin
(74) *Attorney, Agent, or Firm* — COZEN O'CONNOR

(57) ABSTRACT

The present invention relates to a highly bio-based polycarbonate ester and a method for producing same. The highly bio-based polycarbonate ester has a bio-based carbon content of 80% or more since the highly bio-based polycarbonate ester is obtained by copolymerization of 1,4:3,6-dianhydrohexitol, which is a bio-based monomer derived from biomass, and 1,4-cyclohexanedicarboxylate and/or terephthalate, and therefore, the highly bio-based polycarbonate ester is not only human-friendly and environmentally friendly, but also advantageous in terms of biodegradability.

22 Claims, No Drawings

HIGHLY BIO-BASED POLYCARBONATE ESTER AND METHOD FOR PRODUCING SAME

TECHNICAL FIELD

The present invention relates to a highly biobased polycarbonate ester copolymerized from monomers derived from biomass and a process for preparing the same.

BACKGROUND ART

A polycarbonate ester prepared by melt-polycondensation of 1,4:3,6-dianhydrohexitol with a carbonate, a 1,4-cyclohexanedicarboxylate, and/or a terephthalate is a bioplastic that contains 1,4:3,6-dianhydrohexitol, which is a biobased monomer derived from biomass. The biobased polycarbonate ester has high transparency of poly(methyl methacrylate) (PMMA), which is a representative transparent general-purpose resin, and high thermal resistance of bisphenol A (BPA) polycarbonate.

Bioplastics are prepared using monomers derived from various biomass. The biobased carbon content of a bioplastic according to ASTM D6866 is determined by the ratio of the content of radiocarbon ($^{14}C$) in the monomers derived from biomass to the total carbon content.

Meanwhile, in the case of a biobased polycarbonate ester, the biobased carbon content of a homopolycarbonate prepared by melt-polycondensation of 1,4:3,6-dianhydrohexitol as a biobased monomer and a carbonate as a petroleum-based monomer is about 87%, and the biobased carbon content of a homopolyester prepared by melt-polycondensation of 1,4:3,6-dianhydrohexitol as a biobased monomer and a 1,4-cyclohexanedicarboxylate or a terephthalate as a petroleum-based monomer is about 43%. As a result, the biobased carbon content would finally be in the range of about 43% to 87% depending on the copolymerization ratio of a carbonate, a 1,4-cyclohexanedicarboxylate, and a terephthalate, as petroleum-based monomers.

Thus, if a 1,4-cyclohexanedicarboxylate and a terephthalate, which are monomers derived from para-xylene as a representative petroleum-based raw material, are prepared from biomass, it is possible to prepare a highly biobased polycarbonate ester having a biobased carbon content of about 87% or more. The production of such a highly biobased polycarbonate ester has the advantage of continuously utilizing vast amounts of biomass and reducing carbon dioxide emissions, thereby preventing global warming.

DETAILED DESCRIPTION OF THE INVENTION

Technical Problem

Accordingly, the present invention aims to provide a highly biobased polycarbonate ester copolymerized from a 1,4-cyclohexanedicarboxylate and a terephthalate, which are monomers derived from biomass, and a process for preparing the same.

Solution to the Problem

In order to achieve the above object, the present invention provides a highly biobased polycarbonate ester, which comprises at least one selected from the group consisting of a repeat unit 1 represented by the following Formula 1; a repeat unit 2 represented by the following Formula 2, and a repeat unit 3 represented by the following Formula 3, wherein the biobased carbon content derived from biomass according to ASTM D6866 is 80% or more:

[Formula 1]

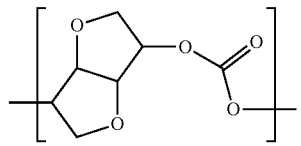

[Formula 2]

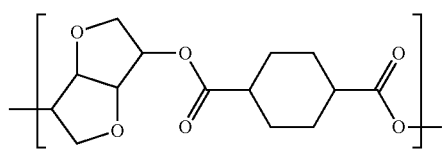

[Formula 3]

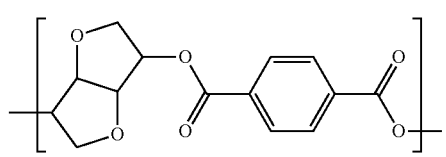

In order to achieve the another object, the present invention provides a process for preparing a highly biobased polycarbonate ester, which comprises melt-polycondensing at least one compound selected from the group consisting of a compound represented by the following Formula 4, a compound represented by the following Formula 5, and a compound represented by the following Formula 6 with 1,4:3,6-dianhydrohexitol:

[Formula 4]

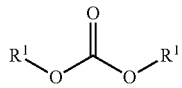

[Formula 5]

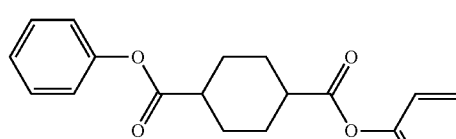

[Formula 6]

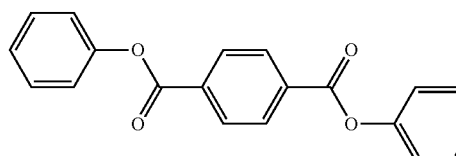

In the above formulae, $R^1$ is each independently an alkyl group having 1 to 18 carbon atoms or an aryl group having 6 to 18 carbon atoms, wherein the aryl group may have at least one substituent selected from the group consisting of an alkyl group having 1 to 18 carbon atoms, a cycloalkyl group having 4 to 20 carbon atoms, an aryl group having 6 to 18 carbon atoms, an alkoxy group having 1 to 18 carbon atoms, a cycloalkoxy group having 4 to 20 carbon atoms, an aryloxy group having 6 to 18 carbon atoms, an alkylsulfonyl group having 1 to 18 carbon atoms, a cycloalkylsulfonyl group having 4 to 20 carbon atoms, an arylsulfonyl group having 6 to 18 carbon atoms, and an ester substituent.

In order to achieve the still another object, the present invention provides a molded article prepared from the highly biobased polycarbonate ester.

Advantageous Effects of the Invention

Since the highly biobased polycarbonate ester of the present invention is copolymerized from 1,4:3,6-dianhydrohexitol, a 1,4-cyclohexanedicarboxylate, and/or a terephthalate, which are biobased monomers derived from biomass, it can have a biobased carbon content of 80% or more, whereby it is not only human-friendly and environmentally friendly, but also advantageous from the viewpoint of biodegradability.

BEST MODE FOR CARRYING OUT THE INVENTION

The present invention is not limited to the disclosures given below, but it may be modified into various forms as long as the gist of the invention is not changed.

Throughout the description of the embodiments, the term "comprise" means that other elements may be included unless otherwise indicated. In addition, all numbers expressing quantities of components, reaction conditions, and the like used herein are to be understood as being modified by the term "about" unless otherwise indicated.

Highly Biobased Polycarbonate Ester

The present invention provides a highly biobased polycarbonate ester, which comprises at least one selected from the group consisting of a repeat unit 1 represented by the following Formula 1; a repeat unit 2 represented by the following Formula 2, and a repeat unit 3 represented by the following Formula 3, wherein the biobased carbon content derived from biomass according to ASTM D6866 is 80% or more:

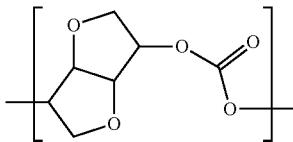

[Formula 1]

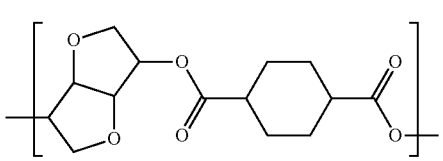

[Formula 2]

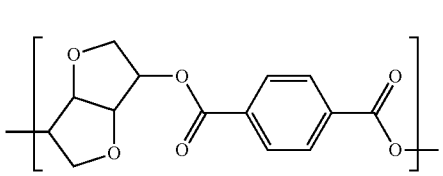

[Formula 3]

The repeat unit 1 (a carbonate bond) may be obtained from the reaction of 1,4:3,6-dianhydrohexitol and a carbonate (e.g., the compound of Formula 4), the repeat unit 2 (an ester bond) may be obtained from the reaction of 1,4:3,6-dianhydrohexitol and a 1,4-cyclohexanedicarboxylate (e.g., the compound of Formula 5), and the repeat unit 3 (an ester bond) may be obtained from the reaction of 1,4:3,6-dianhydrohexitol and a terephthalate (e.g., the compound of Formula 6). In the case where the polymer chain contains carbonate and ester bonds together, it is possible to achieve properties suitable for various applications.

The repeat units represented by the above Formulae 1 to 3 may be selected in various combinations depending on the desired physical properties.

Specifically, the highly biobased polycarbonate ester may comprise the repeat unit 1 represented by the above Formula 1.

The highly biobased polycarbonate ester may comprise the repeat unit 2 represented by the above Formula 2.

The highly biobased polycarbonate ester may comprise the repeat unit 3 represented by the above Formula 3.

The highly biobased polycarbonate ester may comprise the repeat unit 1 represented by the above Formula 1 and the repeat unit 2 represented by the above Formula 2.

The highly biobased polycarbonate ester may comprise the repeat unit 1 represented by the above Formula 1 and the repeat unit 3 represented by the above Formula 3.

The highly biobased polycarbonate ester may comprise the repeat unit 2 represented by the above Formula 2 and the repeat unit 3 represented by the above Formula 3.

The highly biobased polycarbonate ester may comprise the repeat unit 1 represented by the above Formula 1, the repeat unit 2 represented by the above Formula 2, and the repeat unit 3 represented by the above Formula 3.

The 1,4-cyclohexanedicarboxylate (e.g., the compound of Formula 5) and the terephthalate (e.g., the compound of Formula 6) may be obtained by the following methods. Here, the 1,4-cyclohexanedicarboxylate and the terephthalate may be biobased monomers derived from at least one selected from the group consisting of sugar, limonene, and lignin.

The compound of Formula 5 may be obtained from a compound represented by the following Formula 5', and the compound of Formula 6 may be obtained from a compound represented by the following Formula 6':

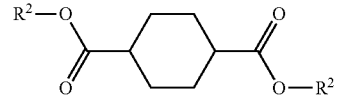

[Formula 5']

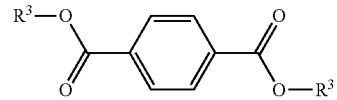

[Formula 6']

In the above formulae, $R^2$ and $R^3$ are each independently hydrogen or methyl.

The compounds represented by Formula 5' and Formula 6' may be obtained by the following methods from biomass such as sugar, limonene, and lignin as raw materials, respectively.

Once biobased terephthalic acid (TPA) has been prepared through various intermediate substances from biomass such as sugar, limonene, and lignin, the biobased TPA and ethanol may be subjected to an esterification reaction to prepare biobased dimethyl terephthalate (DMT), the biobased DMT may be subjected to a ring saturation hydrogenation reaction to prepare biobased 1,4-cyclohexanedicarboxylate (DMCD), and the biobased DMCD may be subjected to a hydrolysis reaction to prepare biobased 1,4-cyclohexanedicarboxylic acid (CHDA). Meanwhile, the biobased TPA may be subjected to a ring saturation hydrogenation reaction to directly prepare biobased CHDA (see the following Reaction Scheme 1).

[Reaction Scheme 1]

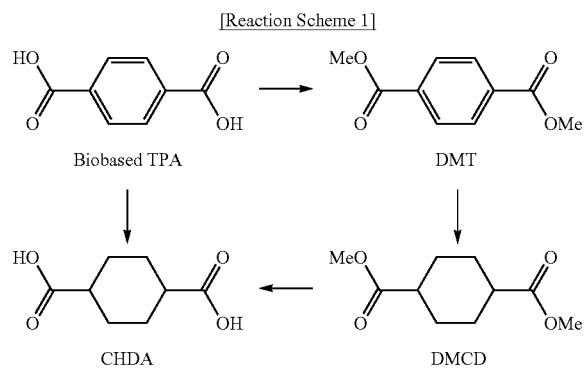

That is, the compound of Formula 5 and the compound of Formula 6 may be biobased monomers derived from at least one selected from the group consisting of sugar, limonene, and lignin.

The cis/trans ratio of the biobased 1,4-cyclohexanedicarboxylate moiety in the repeat unit 2 may be 1/99 to 99/1%, 20/80 to 80/20%, or 30/70 to 70/30%.

1,4:3,6-dianhydrohexitol may be isomannide, isosorbide, or isoidide. Specifically, it may be isosorbide.

When the mol fractions of the repeat units 1 to 3 are x, y, and z, respectively, x is a real number of greater than 0 up to 1, y and z are real numbers of 0 to 1, and x+y, x+z, or x+y+z is 1. Alternatively, y is a real number of greater than 0 up to 1, x and z are real numbers of 0 to 1, and x+y, y+z, or x+y+z is 1. Alternatively, z is a real number of greater than 0 up to 1, x and y are real numbers of 0 to 1, and x+z, y+z, or x+y+z is 1.

Alternatively, x and y are real numbers of greater than 0 up to 1, z is a real number of 0 to 1, and x+y+z is 1. Alternatively, y and z are real numbers of greater than 0 up to 1, x is a real number of 0 to 1, and x+y+z is 1. Alternatively, x and z are real numbers of greater than 0 up to 1, y is a real number of 0 to 1, and x+y+z is 1.

Alternatively, x, y, and z are real numbers of greater than 0 up to 1, and x+y+z is 1.

The highly biobased polycarbonate ester may have a glass transition temperature (Tg) of 100 to 26° C., 110 to 250° C., or 120 to 240° C.

The highly biobased polycarbonate ester may have an intrinsic viscosity (IV) of 0.3 to 2.3 dl/g, 0.3 to 2.0 dl/g, 0.3 to 1.5 dl/g, 0.3 to 1.0 dl/g, 0.6 to 2.0 dl/g, 0.6 to 1.5 dl/g, or 0.6 to 1.0 dl/g.

The highly biobased polycarbonate ester may have a light transmittance according to ASTM D1003 of 90% or more, 91% or more, 92% or more, 90 to 97%, 90 to 95%, or 90 to 93%.

The highly biobased polycarbonate ester may have a pencil hardness of B or higher, F or higher, H or higher, F to 5H, F to 4H, F to 3H, or H to 3H, according to KS M ISO15184.

The highly biobased polycarbonate ester may have a biobased carbon content derived from biomass according to ASTM D6866 of 80% or more, 85% or more, 90% or more, 85 to 99%, 85 to 97%, 85 to 95%, or 88 to 95%.

Specifically, the organic carbon content (% $C_{bio}$) derived from biomass of the highly biobased polycarbonate ester may be defined by the following Equation 1.

$$\% \ C_{bio} = \text{(content ratio of } ^{14}C \text{ isotope relative to } ^{12}C \text{ isotope in the carbon atoms of polycarbonate ester)/(content ratio of } ^{14}C \text{ isotope relative to } ^{12}C \text{ isotope in the carbon atoms of biomass reference material)} \times 100 \quad \text{[Equation 1]}$$

The method of measuring the organic carbon content derived from biomass according to Equation 1 may conform to the method described in ASTM D6866 (Standard Test Methods for Determining the Biobased Content Using Radiocarbon Analysis). The technical meaning and measurement method of the organic carbon content derived from biomass are as follows.

In general, unlike organic substances such as resins derived from fossil raw materials, organic substances such as resins derived from biomass are known to contain the isotope $^{14}C$. More specifically, it is known that all organic substances taken from living organisms such as animals or plants contain three types of isotopes $^{12}C$ (about 98.892% by weight), $^{13}C$ (about 1.108% by weight), and $^{14}C$ (about $1.2 \times 10^{-10}$% by weight) together as carbon atoms and that the ratio of each isotope is kept constant. This is the same as the ratio of each isotope in the atmosphere. Since living organisms continue to metabolize and exchange carbon atoms with the external environment, this isotope ratio remains constant.

Meanwhile, $^{14}C$ is a radioactive isotope, and its content may decrease over time (t) according to the following Equation 2.

$$n = n_0 \cdot \exp(-at) \quad \text{[Equation 2]}$$

In Equation 2, $n_0$ represents the initial content of the $^{14}C$ isotope, n represents the content of the $^{14}C$ isotope remaining after t hours, and a represents the decay constant (or radioactive constant) related to the half-life.

In Equation 2, the half-life of the $^{14}C$ isotope is about 5,730 years. In view of the half-life, organic substances taken from living organisms that constantly interact with the external environment, i.e., organic substances such as resins derived from biomass, can maintain a substantially constant content of the $^{14}C$ isotope and a substantially constant content ratio with other isotopes, for example, $^{14}C/^{12}C$=about $1.2 \times 10^{-12}$, despite the slight reduction in the content of the isotope.

On the other hand, fossil fuels such as coal or oil have been blocked from exchanging carbon atoms with the external environment for more than 50,000 years. Thus, since organic substances such as resins derived from fossil raw materials contain less than 0.2% of the initial content of the $^{14}C$ isotope, as estimated according to Equation 2 above, it can be seen that they do not substantially contain the $^{14}C$ isotope.

The above points are taken into consideration in Equation 1 above. The denominator may be the content ratio of the isotope $^{14}C/^{12}C$ derived from biomass, for example, about $1.2 \times 10^{-12}$, and the numerator may be the content ratio of $^{14}C/^{12}C$ contained in the resin to be measured.

As described above, the organic carbon content derived from biomass among the entire carbon atoms in the highly biobased polycarbonate ester may be calculated by Equation 1 above based on the fact that carbon atoms derived from biomass maintain an isotopic content ratio of about $1.2 \times 10^{-12}$, whereas carbon atoms derived from fossil fuels have such an isotopic content ratio that is substantially zero. Here, the content of each carbon isotope may be determined according to one of two methods described in the ASTM D6866 standard.

Specifically, the radiocarbon analysis, which is a method of measuring radiation generated at the time of fission of carbon, and a method using an accelerated mass spectrometer that directly measures the concentration of radioactive carbon in a sample, may be used to calculate the organic carbon content derived from biomass in Equation 1 above.

In conclusion, the highly biobased polycarbonate ester, which contains a higher amount of carbon derived from biomass, is not only human-friendly and environmentally friendly, but also advantageous from the viewpoint of biodegradability.

Process for Preparing a Highly Biobased Polycarbonate Ester

The present invention provides a process for preparing a highly biobased polycarbonate ester, which comprises melt-polycondensing at least one compound selected from the group consisting of a compound represented by the following Formula 4, a compound represented by the following Formula 5, and a compound represented by the following Formula 6 with 1,4:3,6-dianhydrohexitol:

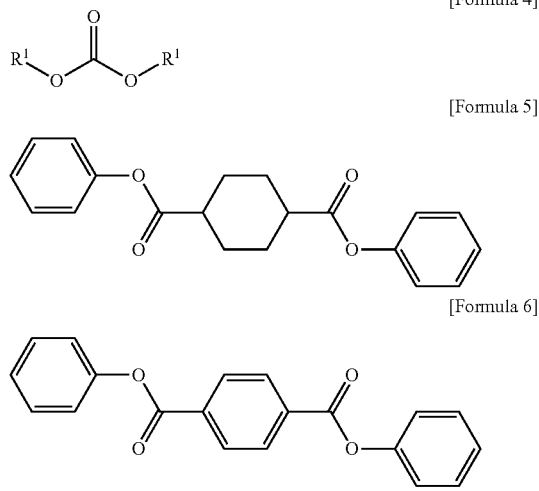

[Formula 4]

[Formula 5]

[Formula 6]

In the above formulae, $R^1$ is as defined above.

The compound represented by the above Formula 4 may be dimethyl carbonate, diethyl carbonate, di-t-butyl carbonate, diphenyl carbonate (DPC), or substituted diphenyl carbonate. Specifically, the compound represented by the above Formula 4 may be diphenyl carbonate or substituted diphenyl carbonate. The substituted diphenyl carbonate may be ditolyl carbonate or bis(methyl salicyl) carbonate.

Since the melt-polycondensation reaction is carried out under reduced pressures, diphenyl carbonate, ditolyl carbonate, or bis(methyl salicyl) carbonate may be used as the compound represented by the above Formula 4.

The compound represented by the above Formula 5 may be obtained by reacting a compound represented by the following Formula 5' with a halogen-containing compound (or a halogenated compound) to convert it into an intermediate reactant (e.g., a compound represented by the following Formula 5") containing a halogen functional group at the terminal, followed by subjecting it to a nucleophilic reaction with phenol or a phenol substituent, or by an esterification or transesterification reaction of a compound represented by the following Formula 5' with phenol or a phenol substituent (see Reaction Scheme 2 below):

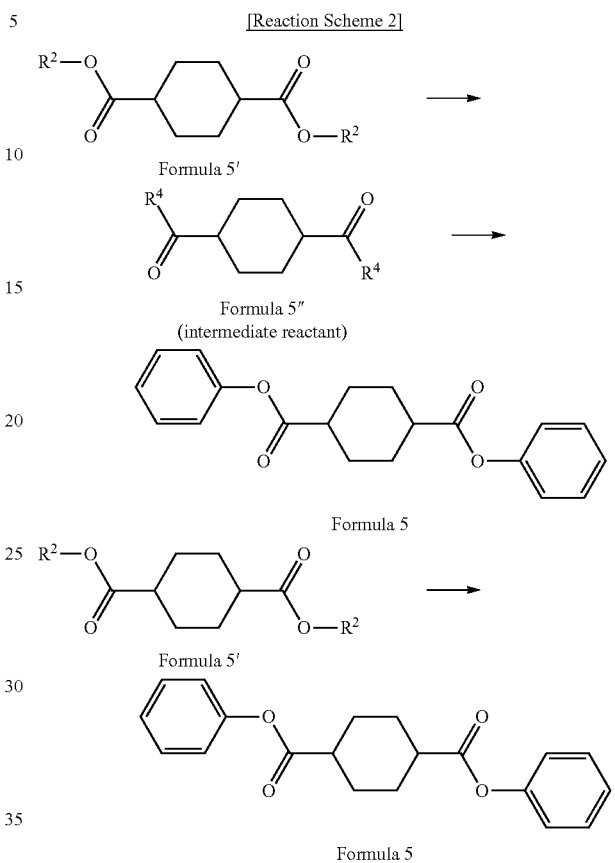

[Reaction Scheme 2]

Formula 5'

Formula 5"
(intermediate reactant)

Formula 5

Formula 5'

Formula 5

In the above Reaction Scheme, $R^2$ is each independently hydrogen or methyl, and $R^4$ is each independently F, Cl, or Br.

The compound represented by the above Formula 5' may be reacted with a halogenated compound to prepare an intermediate reactant (e.g., a compound represented by the above Formula 5") containing a halogen functional group at the terminal. The compound represented by the above Formula 5" may be 1,4-cyclohexanedicarbonyl chloride (CHDC) in which $R^4$ is Cl.

The halogenated compound may be at least one selected from the group consisting of phosgene, triphosgene, thionyl chloride, oxalyl chloride, phosphorus trichloride, phosphorus pentachloride, phosphorus pentabromide, and cyanuric fluoride. Specifically, the halogenated compound may be at least one chlorinating agent selected from the group consisting of phosgene, thionyl chloride, and oxalyl chloride, from which the reaction by-products can be readily removed. In addition, the halogenated compound may preferably be phosgene from a commercial viewpoint.

The amount of the halogenated compound to be added may be 1 to 10 times, 1.5 to 7.5 times, or 2 to 5 times the molar amount of the compound represented by the above Formula 5' initially employed.

The reaction conditions and time in the conversion to the intermediate reactant may vary depending on the type of the compound represented by the above Formula 5' and the halogenated compound. Specifically, the conversion to the intermediate reactant may be carried out at atmospheric pressure at a temperature of −30 to 150° C. for 5 minutes to 48 hours. More specifically, the conversion to the intermediate reactant may be carried out at atmospheric pressure at a temperature of 20 to 100° C. or 40 to 80° C. for 10 minutes to 24 hours.

In the conversion to the intermediate reactant, an organic solvent may be used to dissolve or disperse the compound represented by the above Formula 5'.

In such event, the organic solvent that may be used is, for example, benzene, toluene, xylene, mesitylene, methylene chloride, dichloroethane, chloroform, carbon tetrachloride, monochlorobenzene, o-dichlorobenzene, tetrahydrofuran, dioxane, acetonitrile, or a mixture thereof.

In order to increase the conversion rate and the reaction yield of the intermediate reactant, a catalyst may be used depending on the kind of the compound represented by the above Formula 5' and the halogenated compound used in the conversion to the intermediate reactant.

The type of the catalyst is not particularly limited as long as it meets this object. For example, an organic catalyst, an inorganic catalyst, or the like may be used.

Dimethylformamide, dimethylacetamide, methylpyrrolidone, dimethyl imidazolidinone, tetramethylurea, tetraethylurea, tetrabutylurea, or a mixture thereof may be used as the organic catalyst.

Aluminum chloride ($AlCl_3$), iron chloride ($FeCl_3$), bismuth chloride ($BiCl_3$), gallium chloride ($GaCl_3$), antimony pentachloride ($SbCl_5$), boron trifluoride ($BF_3$), bismuth trifluoromethanesulfonate ($Bi(OTf)_3$), titanium tetrachloride ($TiCl_4$), zirconium tetrachloride ($ZrCl_4$), titanium tetrabromide ($TiBr_4$), zirconium tetrabromide ($ZrBr_4$), or a mixture thereof may be used as the inorganic catalyst.

Specifically, dimethylformamide, dimethyl imidazolidinone, or tetramethylurea may be used as the organic catalyst, and aluminum chloride or titanium tetrachloride may be used as the inorganic catalyst. More specifically, it is commercially advantageous to use dimethylformamide as the organic catalyst and aluminum chloride as the inorganic catalyst.

The amount of the catalyst to be used in the conversion to the intermediate reactant is not particularly limited, but it varies depending on the kind of the compound represented by the above Formula 5' and the halogenated compound. Specifically, the amount of the catalyst used in the conversion to the intermediate reactant may be in the range of greater than 0 to 10% by mol, greater than 0 to 5% by mol, or greater than 0 to 3% by mol, based on the total molar amount of the compound represented by the above Formula 5' initially employed.

If the amount of the catalyst used in the conversion to the intermediate reactant is within the above range, it is possible to prevent the problems that the reaction rate is lowered and that a runaway reaction and an exothermic reaction are induced.

The phenol substituent may be a compound represented by the following Formula 7.

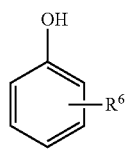

[Formula 7]

In the above formula, $R^6$ is an alkyl group having 1 to 18 carbon atoms or an aryl group having 6 to 18 carbon atoms, wherein the aryl group may have at least one substituent selected from the group consisting of an alkyl group having 1 to 18 carbon atoms, a cycloalkyl group having 4 to 20 carbon atoms, an aryl group having 6 to 18 carbon atoms, an alkoxy group having 1 to 18 carbon atoms, a cycloalkoxy group having 4 to 20 carbon atoms, an aryloxy group having 6 to 18 carbon atoms, an alkylsulfonyl group having 1 to 18 carbon atoms, a cycloalkylsulfonyl group having 4 to 20 carbon atoms, an arylsulfonyl group having 6 to 18 carbon atoms, and an ester substituent. In such event, the ester substituent may be an alkyl ester having 1 to 18 carbon atoms, a cycloalkyl ester having 4 to 20 carbon atoms, or an aryl ester having 6 to 18 carbon atoms.

The molar ratio of the compound represented by the above Formula 5" to phenol or a phenol substituent in the above nucleophilic reaction may be 1:1 to 1:5 or 1:2 to 1:3.

Within the above range, the compound represented by the above Formula 5 may be prepared in high yield. If it is outside the above range, for example, if the amount of phenol or a phenol substituent is insufficient, the production yield may be reduced.

In addition, the compound represented by the above Formula 5 may be prepared by an esterification or transesterification reaction of a compound represented by the above Formula 5' with phenol or a phenol substituent.

The esterification or transesterification reaction may be carried out at 20 to 300° C. Specifically, the esterification or transesterification reaction may be carried out at atmospheric pressure at 50 to 250° C. or 100 to 200° C. or under a pressure of 0.1 to 10 kgf/cm² or 1 to 5 kgf/cm² at 50 to 300° C.

The esterification or transesterification reaction may be carried out for 5 minutes to 48 hours or 10 minutes to 24 hours.

In the esterification or transesterification reaction, the molar ratio of the compound represented by the above Formula 5' to phenol or a phenol substituent may be 1:2 to 1:40. Specifically, in the esterification or transesterification reaction, the molar ratio of the compound represented by the above Formula 5' to phenol or a phenol substituent may be 1:3 to 1:30 or 1:4 to 1:20.

If the molar ratio of the compound represented by the above Formula 5' and phenol or a phenol substituent is within the above range, it is possible to prevent a reduction in the production yield.

In such event, the cis/trans ratio of the compound represented by the above Formula 5 may be 1/99 to 99/1%, 10/90 to 90/10%, or 20/80 to 80/20%.

The compound represented by the above Formula 6 may be obtained by reacting a compound represented by the following Formula 6' with a halogenated compound to convert it into an intermediate reactant (e.g., a compound represented by the following Formula 6") containing a halogen functional group at the terminal, followed by subjecting it to a nucleophilic reaction with phenol or a phenol substituent, or by an esterification or transesterification reaction of a compound represented by the following Formula 6' with phenol or a phenol substituent (see Reaction Scheme 3 below):

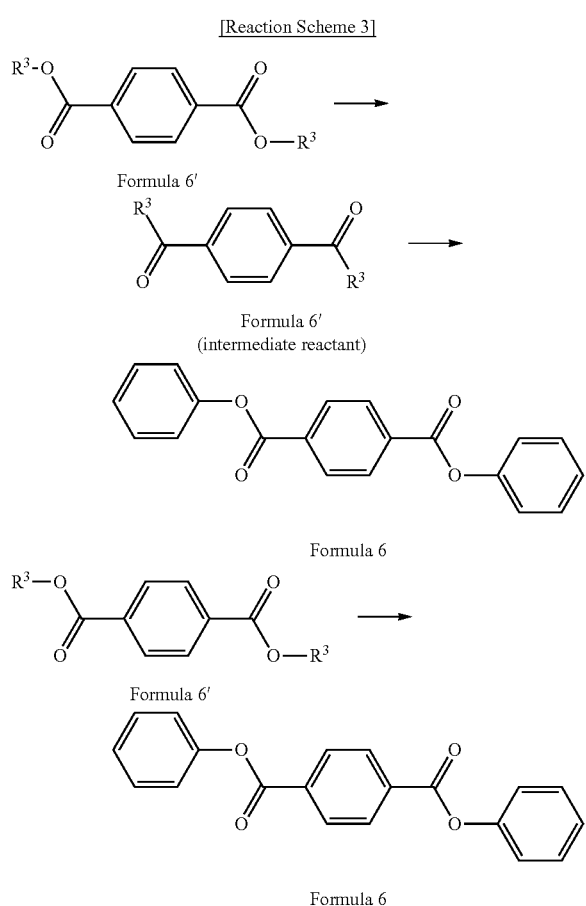

[Reaction Scheme 3]

Formula 6'

Formula 6'
(intermediate reactant)

Formula 6

Formula 6'

Formula 6

In the above Reaction Scheme, $R^3$ is each independently hydrogen or methyl, and $R^5$ is each independently F, Cl, or Br.

The compound represented by the above Formula 6' may be reacted with a halogenated compound to prepare an intermediate reactant (e.g., a compound represented by the above Formula 6") containing a halogen functional group at the terminal. The compound represented by the above Formula 6" may be terephthaloyl chloride (TPC) in which $R^5$ is Cl.

In addition, the specific type and amount of the halogenated compound are the same as described above.

In addition, the process of preparing an intermediate reactant by reacting the compound represented by the above Formula 6' with the halogenated compound, for example, the reaction temperature and time, the type of organic solvent used, the type of catalyst and the amount used are the same as the process of preparing the compound represented by the above Formula 5".

The molar ratio of the compound represented by the above Formula 6" to phenol or a phenol substituent in the above nucleophilic reaction may be 1:1 to 1:5 or 1:2 to 1:3.

Within the above range, the compound represented by the above Formula 6 may be prepared in high yield. If it is outside the above range, for example, if the amount of phenol or a phenol substituent is insufficient, the production yield may be reduced.

In addition, the compound represented by the above Formula 6 may be prepared by an esterification or transesterification reaction of a compound represented by the above Formula 6' with phenol or a phenol substituent. The specific conditions (reaction temperature, pressure, used amounts, and the like) of the esterification or transesterification reaction are the same as described above.

The compounds represented by the above Formulae 4 to 6 are each subjected to a melt-polycondensation reaction with 1,4:3,6-dianhydrohexitol to form the repeat units 1 to 3 represented by the above Formulae 1 to 3.

The melt-polycondensation reaction may be carried out with temperature elevation and depressurization in a stepwise manner in order to rapidly remove by-products from the molten reactants having a high viscosity and to promote the polymerization reaction.

Specifically, the melt-polycondensation reaction may comprise (1) a first reaction at a reduced pressure of 50 to 700 Torr and at a temperature of 130 to 250° C., 140 to 240° C., or 150 to 230° C. for 0.1 to 10 hours or 0.5 to 5 hours; and (2) a second reaction at a reduced pressure of 0.1 to 20 Torr and at a temperature of 200 to 350° C., 220 to 280° C., or 230 to 270'C for 0.1 to 10 hours or 0.5 to 5 hours.

Specifically, the melt-polycondensation reaction may comprise (1) a first reaction under the conditions of raising the temperature to 130 to 200° C., followed by reducing the pressure to 200 to 700 Torr, and raising the temperature to 200 to 250° C. at a rate of 0.1 to 10° C./minute, followed by reducing the pressure to 50 to 180 Torr; and (2) a second reaction under the conditions of reducing the pressure to 1 to 20 Torr and raising the temperature to 200 to 350° C. at a rate of 0.1 to 5° C./minute, followed by reducing the pressure to 0.1 to 1 Torr.

Meanwhile, phenol may be produced as a reaction by-product during the melt-polycondensation reaction. It is preferable that phenol produced as a by-product is removed from the reaction system in order to shift the reaction equilibrium towards the production of the polycarbonate ester. If the rate of temperature elevation in the melt-polycondensation reaction is within the above ranges, it is possible to prevent the problem that phenol, a reaction by-product, evaporates or sublimes together with the reaction raw materials. Specifically, the highly biobased polycarbonate ester may be prepared in a batch or continuous process.

In particular, for the preparation of a highly biobased polycarbonate ester with high transparency, the melt-polycondensation reaction using 1,4:3,6-dianhydrohexitol may be preferably carried out at relatively low temperatures. In addition, in order to secure the mechanical properties of the polymer thus prepared, it is preferable that the melt-polycondensation reaction is carried out to a high degree of polymerization. For this purpose, it is effective to use a high viscosity polymerization reactor for the melt-polycondensation reaction. The target viscosity of the melt-polycondensation reaction may be 10,000 to 1,000,000 poises, 20,000 to 500,000 poises, or 30,000 to 200,000 poises.

1,4:3,6-Dianhydrohexitol 1,4:3,6-dianhydrohexitol may be isomannide, isosorbide, or isoidide. Specifically, it may be isosorbide.

Meanwhile, it is very important to maintain a high purity of 1,4:3,6-dianhydrohexitol used in the melt-polycondensation in order to enhance the heat resistance, transparency, and mechanical properties of the highly biobased polycarbonate ester thus prepared. 1,4:3,6-dianhydrohexitol may be used in the form of powder, flake, or an aqueous solution. If 1,4:3,6-dianhydrohexitol is exposed to air for a long period of time, however, it may be readily oxidized and discolored, which may give rise to a problem that the color and molecular weight of the final polymer would not be satisfactory. Thus, it is necessary to minimize the exposure of 1,4:3,6-dianhydrohexitol to air. Once 1,4:3,6-dianhydrohexitol is exposed to air, it is preferably stored with a deoxidizing agent such as an oxygen absorber. In addition, it is very important to purify 1,4:3,6-dianhydrohexitol by removing the impurities contained therein, which have been produced in the multi-step process of preparing 1,4:3,6-dianhydrohexitol, in order to maintain the purity thereof. Specifically, in the purification of 1,4:3,6-dianhydrohexitol by vacuum distillation, it is crucial to remove a trace level of acidic liquid components that can be removed by an initial separation and alkali metal components that can be removed by a residue separation. Each of the acidic liquid components and alkali metal components may be kept at a level of 10 ppm or lower, 5 ppm or lower, or 3 ppm or lower.

Additional Diol Compound

The highly biobased polycarbonate ester may further comprise a repeat unit obtained by using an additional diol compound other than 1,4:3,6-dianhydrohexitol.

Specifically, a diol compound other than 1,4:3,6-dianhydrohexitol may be additionally used in the melt-polycondensation reaction. Specifically, the additional diol compound may be obtained from a biomass or petroleum-based raw material, but the kind thereof is not limited. For example, the additional diol compound may be a biobased monomer derived from at least one selected from the group consisting of sugar, limonene, and lignin.

The additional diol compound may be used as a primary, secondary, or tertiary diol or various combinations thereof, depending on the desired physical properties.

The additional diol compound may be, for example, at least one selected from the group consisting of ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,15-pentadecanediol, 1,16-hexadecanediol, triethylene glycol, tetraethylene glycol, pentaethylene glycol, hexaethylene glycol, heptaethylene glycol, octaethylene glycol, nonaethylene glycol, decaethylene glycol, undecaethylene glycol, dodecaethylene glycol, 1,2-cyclohexanedimethanol, 1,3-cyclohexanedimethanol, 1,4-cyclohexanedimethanol (CHDM), tricyclodecane dimethanol, pentacyclopentadecanedimethanol, decalindimethanol, tricyclotetradecanedimethanol, norbornanedimethanol, adamantanedimethanol, 3,9-bis(1,1-dimethyl-2-hydroxyethyl)-2,4,8,10-tetraoxaspiro[5,5]undecane, bicyclo[2.2.2]octane-2,3-dimethanol, 1,2-cyclohexanediol, 1,3-cyclohexanediol, 1,4-cyclohexanediol, 2-methyl-1,4-cyclohexanediol, tricyclodecanediol, pentacyclopentadecanediol, decalindiol, tricyclotetradecanediol, norbornanediol, adamantanediol, 2,2-bis(4-hydroxycyclohexyl)propane, 2,2,4,4-tetramethyl-1,3-cyclobutanediol, hydroquinone, biphenol, 2,2-bis(4-hydroxyphenyl)propane, 2,2-bis(4-hydroxy-3,5-dimehtylphenyl)propane, 2,2-bis(4-hydroxy-3,5-diehtylphenyl)propane, 1,1-bis(4-hydroxyphenyl)-1-phenyl-ethane, 1,1-bis(4-hydroxyphenyl)cyclohexane, 1,1-bis(4-hydroxyphenyl)-3,3,5-trimethyl-cyclohexane, 5,5'-(1-methylethyliden)-bis[1,1'-(bisphenyl)-2-ol]propane, 1,4-bis[2-(4-hydroxyphenyl)-2-propyl]benzene, bis(4-hydroxyphenyl)sulfone, 1,3-bis[2-(4-hydroxyphenyl)-2-propyl]benzene, 2,2-bis(4-hydroxy-3-isopropyl-phenyl)propane, bis(4-hydroxyphenyl)methane, 1,1-bis(4-hydroxyphenyl)ethane, bis(4-hydroxyphenyl)-2,2-dichloroethylene, 2,2-bis(3-methyl-4-hydroxyphenyl)propane, bis(4-hydroxyphenyl)diphenylmethane, 2,2-bis(4-hydroxyphenyl)butane, 2,2-bis(4-hydroxyphenyl)hexafluoropropane, 3,3'-spiro-bis(1,1-dimethyl-2,3-dihydro-1H-inden-5-ol), dispiro[5.1.5.1]tetradecane-7,14-diol, 5,5'-(1-methylethylidene)bis(2-furanmethanol), 2,4:3,5-di-o-methylene-D-mannitol, and tetrahydrofuran-2,5-dimethanol that can be prepared from biomass raw materials.

Specifically, the additional diol compound may be 1,14-tetradecanediol, 1,4-cyclohexanedimethanol (CHDM), tricyclodecane dimethanol, 3,9-bis(1,1-dimethyl-2-hydroxyethyl)-2,4,8,10-tetraoxaspiro[5,5]undecane, bicyclo[2.2.2]octane-2,3-dimethanol, 2,2-bis(4-hydroxycyclohexyl)propane, 2,2,4,4-tetramethyl-1,3-cyclobutanediol, or tetrahydrofuran-2,5-dimethanol.

CHDM (the following Formula 8) may also be derived from biomass. Specifically, it may be obtained by an ester-reduction hydrogenation reaction of the compound represented by the above Formula 5'.

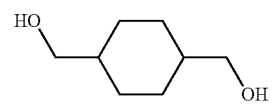

[Formula 8]

If the highly biobased polycarbonate ester comprises the additional diol compound, 1,4:3,6-dianhydrohexitol may be used in an amount of 1% mol or more based on 100% mol of the total amount of the diol compounds.

Specifically, when the molar ratio of the additional diol compound employed is p, the molar ratio of 1,4:3,6-dianhydrohexitol employed is to be 1-p. In particular, if a petroleum-based diol compound is used as the additional diol compound, it may be used in such an amount that the biobased carbon content of a final polymer obtained from 1,4:3,6-dianhydrohexitol, a compound represented by Formula 5, and a compound represented by Formula 6, as biobased monomers, is in a range of 80% or more, 85% or more, 90% or more, 85 to 99%, 85 to 97%, 85 to 95%, or 88 to 95%.

Additional Diphenyl Ester Compound

The highly biobased polycarbonate ester may further comprise a repeat unit obtained by using an additional diphenyl ester compound other than the carbonate, 1,4-cyclohexanedicarboxylate, and terephthalate depending on the desired physical properties.

The additional diphenyl ester compound may be prepared by reacting a primary, secondary, or tertiary dicarboxylate, dicarboxylic acid, or various combinations thereof with phenol or a phenol substituent, depending on the desired physical properties.

For example, the additional diphenyl ester compound may be obtained from a biomass or petroleum-based raw material, but the kind thereof is not limited. For example, the additional diphenyl ester compound may be a biobased monomer derived from at least one selected from the group consisting of sugar, limonene, and lignin.

Specifically, the additional diphenyl ester compound may be at least one selected from the group consisting of diphenyl oxalate, diphenyl malonate, diphenyl succinate, diphenyl glutarate, diphenyl adipate, diphenyl pimelate, diphenyl suberate, diphenyl azelate, diphenyl sebacate, diphenyl undecanedioate, diphenyl dodecanedioate, diphenyl tridecanedioate, diphenyl tetradecanedioate, diphenyl pentadecanedioate, diphenyl hexadecanedioate, 1,2-diphenyl-cyclohexanedicarboxylate, 1,3-diphenyl-cyclohexanedicarboxylate, diphenyl decahydronaphthalene- 2,4-dicarboxylate, diphenyl decahydronaphthalene-2,5-dicarboxylate, diphenyl decahydronaphthalene-2,6-dicarboxylate, diphenyl decahydronaphthalene-2,7-dicarboxylate, diphenyl tetrahydrofuran-2,5-dicarboxylate, diphenyl isophthalate, 4,4'-diphenyl-biphenyldicarboxylate, 4,4'-diphenyl-ethylidenebisbenzoate, 4,4'-diphenyl-oxybisbenzoate, 2,4-diphenyl-naphthalenedicarboxylate, 2,5-diphenyl-naphthalenedicarboxylate, 2,6-diphenyl-naphthalenedicarboxylate, 2,7-diphenyl-naphthalenedicarboxylate, and 2,5-diphenyl-furandicarboxylate.

More specifically, the highly biobased polycarbonate ester may further comprise a repeat unit obtained by using diphenyl sebacate, diphenyl decahydronaphthalene-2,6-dicarboxylate, diphenyl tetrahydrofuran-2,5-dicarboxylate, or 2,5-diphenyl-furandicarboxylate.

If the highly biobased polycarbonate ester comprises the additional diphenyl ester compound, the additional diphenyl ester compound may be used in an amount of 1% mol or more based on 100% mol of the total amount of the carbonate and/or diphenyl ester compounds.

Specifically, when the molar ratio of the additional diphenyl ester compound employed is q, the molar ratio of the carbonate and/or diphenyl ester employed is to be 1–q. In particular, if a petroleum-based diphenyl ester compound is used as the additional diphenyl ester compound, it may be used in such an amount that the biobased carbon content of a final polymer obtained from 1,4:3,6-dianhydrohexitol, a compound represented by Formula 5, and a compound represented by Formula 6, as biobased monomers, is in a range of 80% or more, 85% or more, 90% or more, 85 to 99%, 85 to 97%, 85 to 95%, or 88 to 95%.

Catalyst for the Melt-Polycondensation Reaction and Additives

In the above melt-polycondensation reaction, a catalyst may be used for enhancing the reactivity of the reaction. The catalyst may be added to the reaction step at any time, but it is preferably added before the reaction.

Any alkali metal and/or alkali earth metal catalyst commonly used in a polycarbonate melt-polycondensation reaction may be used as the catalyst. In addition, an oxide, hydride, amide, or phenolate of an alkali metal and/or an alkaline earth metal may be used as the catalyst.

Examples of the alkali metal catalysts may include lithium hydroxide (LiOH), sodium hydroxide (NaOH), potassium hydroxide (KOH), cesium hydroxide (CsOH), lithium carbonate ($Li_2CO_3$), sodium carbonate ($Na_2CO_3$), potassium carbonate ($K_2CO_3$), cesium carbonate ($Cs_2CO_3$), lithium acetate (LiOAc), sodium acetate (NaOAc), potassium acetate (KOAc), cesium acetate (CsOAc), and the like.

Examples of the alkali earth metal catalysts may include calcium hydroxide ($Ca(OH)_2$), barium hydroxide ($Ba(OH)_2$), magnesium hydroxide ($Mg(OH)_2$), strontium hydroxide ($Sr(OH)_2$), calcium carbonate ($CaCO_3$), barium carbonate ($BaCO_3$), magnesium carbonate ($MgCO_3$), strontium carbonate ($SrCO_3$), calcium acetate ($Ca(OAc)_2$), barium acetate ($Ba(OAc)_2$), magnesium acetate ($Mg(OAc)_2$), strontium acetate ($Sr(OAc)_2$), and the like.

Examples of the oxide, hydride, amide, or phenolate of an alkali metal and/or an alkaline earth metal may include magnesium oxide (MgO), barium oxide (BaO), sodium aluminate ($NaAlO_2$), zinc oxide (ZnO), lead oxide (PbO), dibutyltin oxide (($C_4H_9)_2SnO$), antimony trioxide ($Sb_2O_3$), and the like.

Examples of the alkali metal and/or alkaline earth metal oxide may include magnesium oxide (MgO), barium oxide (BaO), sodium aluminate ($NaAlO_2$), zinc oxide (ZnO), lead oxide (PbO), dibutyltin oxide (($C_4H_9)_2SnO$), antimony trioxide ($Sb_2O_3$), and the like.

The catalyst may be used in such an amount that the metal equivalent of the catalyst is greater than 0 to 5 mmol, greater than 0 to 3 mmol, or greater than 0 to 1 mmol, based on 1 mol of the entire diol compounds. If the amount of the catalyst is within the above range, side reactions are suppressed to obtain a polymer having excellent physical properties such as transparency. If it is outside the above range, there may be a problem that the target polymerization degree is not reached and that side reactions take place to lower the transparency of the polymer thus prepared.

Meanwhile, the alkali metal and/or alkaline earth metal catalyst may be used in combination with a basic catalyst such as a basic ammonium or amine, a basic phosphorous, or a basic boron compound. The basic catalyst may be used alone or in combination, and the amount thereof is not particularly limited.

In addition, if needed during the melt-polycondensation reaction, it may further comprise an additive such as an antioxidant, a heat stabilizer, a light absorber, a color former, a lubricant, a colorant, a conductive agent, a nucleation agent, a flame retardant, a plasticizer, an antistatic agent, and the like.

For example, the antioxidant and heat stabilizer may be hindered phenol, hydroquinone, phosphite, a substituted compound thereof, or the like.

Examples of the light absorber include resorcinol, salicylate, and the like.

Further, the color former may be phosphite, hydrophosphite, or the like. The lubricant may be montanic acid, stearyl alcohol, or the like.

A dye or a pigment may be used as the colorant, and carbon black may be used as the conductive agent or the nucleation agent.

Here, the types and amounts of the aforementioned additives are not particularly limited as long as they do not adversely affect the properties, especially transparency, of the highly biobased polycarbonate ester thus prepared.

The present invention provides a molded article prepared from the highly biobased polycarbonate ester. The molded article may be prepared by molding the highly biobased polycarbonate ester by various molding methods such as injection molding, extrusion molding, blow molding, and profile extrusion molding, and post-processing such as thermoforming using the same. The specific shape and size of the molded article may be variously determined depending on the application, and examples thereof are not particularly limited.

As described above, since the highly biobased polycarbonate ester according to the present invention is copolymerized from 1,4:3,6-dianhydrohexitol, 1,4-cyclohexanedicarboxylate (e.g., the compound represented by the above Formula 5), and/or a terephthalate (e.g., the compound represented by the above Formula 6), which are biobased monomers derived from biomass, it can have a biobased carbon content of 80% or more, whereby it is not only human-friendly and environmentally friendly, but also advantageous from the viewpoint of biodegradability.

EMBODIMENTS FOR CARRYING OUT THE INVENTION

Hereinafter, the present invention will be described in more detail with reference to the following examples. However, these examples are set forth to illustrate the present invention, and the scope of the present invention is not limited thereto.

[Preparation Example] Synthesis of Biobased Monomers

Preparation of a Compound Represented by Formula 5' or 6'

Preparation Example 1: Synthesis of Biobased TPA 31.6 g of ethylenediamine (525 mmol), 3.34 g of anhydrous $FeCl_3$ (145 mmol), and 0.16 g of sodium (0.964 mmol) were mixed and heated at 50° C. under nitrogen. 101 g of biobased α-limonene (742 mmol; Sigma-Aldrich) was slowly added dropwise to the mixture, which was then heated to a temperature of 100° C. and maintained for 8 hours. Then, the reaction mixture was cooled to room temperature, diluted with 300 g of water, and extracted twice with 400 g of dichloromethane (DCM). The extracted organic layer was dried over magnesium sulfate and evaporated using a rotary evaporator to obtain crude para-cymene (yield: 99%).

288 g of 65% $HNO_3$ (2,968 mmol) was added to a mixture of the crude para-cymene and 400 g of water, which was then reacted. The reaction mixture was refluxed with heating for 1 day, then cooled to room temperature, and extracted with 530 g of DCM. Then, the extracted organic layer was washed twice with water and evaporated using a rotary evaporator to obtain para-cymene oxide.

83 g of NaOH (1,484 mmol) was added to a mixture of the para-cymene oxide and 1,000 g of water, which was then dissolved with stirring. Then, 235 g of potassium permanganate (1,484 mmol) was slowly added thereto, which was refluxed with heating for 16 hours to obtain a mixture in a slurry state. Thereafter, the slurry mixture was filtered through celite and then washed with water. Then, concentrated $H_2SO_4$ (98%) was added to the water layer until it became strongly acidic to obtain a white precipitate. The precipitate was filtered and washed with water and DCM. All of the white solid products thus obtained were dried at 80° C. and 50 mmHg for 12 hours to obtain biobased TPA (yield: 93%).

Preparation Example 2: Synthesis of Biobased DMT 3.1 g of concentrated $H_2SO_4$ (31.6 mmol) was added to a mixture of 105 g of the biobased TPA (632 mmol) obtained in Preparation Example 1 and 1,650 g of methanol (6,320 mmol), which was refluxed with heating for 1 day. Thereafter, the solution was cooled to room temperature, and the solid obtained after the removal of the solvent was dissolved in 530 g of DCM. The solution was washed with water, and the organic layer was dried over magnesium sulfate and evaporated using a rotary evaporator to obtain a crude solid product. The solid product was washed with cold methanol and dried at 90° C. for 12 hours to obtain biobased DMT (yield: 95%). The biobased carbon content of the biobased DMT was 83%.

Preparation Example 3: Synthesis of Biobased DMCD

A fixed-bed continuous reactor was charged with a tablet-molded catalyst in which 1% by weight of ruthenium (Ru) had been supported on alumina. The biobased DMT obtained in Preparation Example 2 was supplied to the upper region of the reactor at a rate of 80 liter/h, along with hydrogen gas at a rate of 7 cm/s, and the ring hydrogenation reaction was carried out at a reaction pressure of 40 $kgf/cm^2$. The reaction temperature was maintained at 140° C. to 155° C. in the upper region of the reactor, 135° C. to 145° C. in the intermediate region of the reactor, and 125° C. to 135° C. in the lower region of the reactor, respectively, and the maximum temperature difference in the reactor was within 20° C. After the reaction for a period of 5 to 10 hours, a crude liquid product was obtained from the lower region of the reactor. The liquid product was subjected to vacuum distillation to obtain biobased DMCD. The biobased carbon content of the biobased DMCD was 83%.

Preparation Example 4: Synthesis of Biobased CHDA

A 2-liter round bottom flask equipped with a 4-bladed agitator, a condenser, and a thermometer was charged with 200 g (1 mol) of biobased DMCD (Preparation Example 3), 600 g of water, 1.27 g (0.2 mol) of p-toluenesulfonic acid, which was then refluxed with heating for 3 hours to obtain a mixture in a slurry state. Then, the slurry mixture was filtered through celite and then washed with water. The white solid product thus obtained was dried under vacuum at 80° C. for 12 hours to obtain biobased CHDA (yield: 84%). The biobased carbon content of the biobased CHDA was 85%.

Preparation of a Compound Represented by Formula 5

Preparation Example 5: Synthesis of Biobased DPCD Using Biobased CHDA

A 1-liter round-bottom flask equipped with a 4-blade agitator, inlets for phosgene and nitrogen gas, an outlet for discharged gas, and a thermometer was charged with 100 g (0.6 mol) of biobased CHDA (Preparation Example 4) and 200 g of toluene. The mixture was stirred at room temperature. 1.28 mol of phosgene gas was fed to the flask at atmospheric pressure for 10 hours to carry out the reaction. Thereafter, nitrogen gas was fed to the flask for 2 hours to remove the residual phosgene and hydrochloric acid gas produced as a by-product, thereby yielding a transparent and homogeneous reaction solution.

Then, 50% by weight of toluene initially supplied was distilled off from the reaction solution under a reduced pressure. Thereafter, a phenol solution in which 121 g (1.28 mol) of phenol had been dissolved in 121 g of toluene was added through a dropping funnel to the reaction solution for 2 hours. The mixture was stirred for 1 hour. Upon termination of the reaction, toluene was distilled off from the reaction solution under a reduced pressure to obtain a crude solid product. The solid product was purified by recrystallization and dried under vacuum at 70° C. for 18 hours to obtain biobased DPCD (yield: 85%). The biobased carbon content of the biobased DPCD was 98%.

Preparation Example 6: Synthesis of Biobased DPCD Using Biobased CHDA

The procedures of Preparation Example 5 were repeated to prepare biobased DPCD (yield: 84%), except that 1.27 g (0.017 mol) of dimethylformamide was employed as an organic catalyst. The biobased carbon content of the biobased DPCD was 98%.

Preparation Example 7: Synthesis of Biobased DPCD Using Biobased DMCD

A 1-liter round-bottom flask equipped with a 4-blade agitator, inlets for phosgene and nitrogen gas, an outlet for discharged gas, and a thermometer was charged with 100 g (0.51 mol) of biobased DMCD (Preparation Example 3), 2.0 g (0.015 mol) of aluminum chloride, and 200 g of toluene. The mixture was stirred at room temperature. 1.10 mol of phosgene gas was fed to the flask at atmospheric pressure for 10 hours to carry out the reaction. Thereafter, nitrogen gas was fed to the flask for 2 hours to remove the residual phosgene and hydrochloric acid gas produced as a by-product, thereby yielding a transparent and homogeneous reaction solution.

Then, 50% by weight of toluene initially supplied was distilled off from the reaction solution under a reduced pressure. Thereafter, a phenol solution in which 100 g (1.06 mol) of phenol had been dissolved in 100 g of toluene was added through a dropping funnel to the reaction solution for 2 hours. The mixture was stirred for 1 hour. Upon termination of the reaction, toluene was distilled off from the reaction solution under a reduced pressure to obtain a crude solid product. The solid product was purified by recrystallization and dried under vacuum at 70° C. for 18 hours to obtain biobased DPCD (yield: 87%). The biobased carbon content of the biobased DPCD was 98%.

Preparation Example 8: Synthesis of Biobased DPCD Using Biobased CHDA

A 1-liter autoclave equipped with a 4-blade agitator, a cooling condenser, and a thermometer was charged with 100 g (0.6 mol) of biobased CHDA (Preparation Example 4), 565 g (6 mol) of phenol, and 1.83 g (0.01 mol) of zinc acetate ($Zn(OAc)_2$) as a catalyst. Then, the mixture was heated to 100° C. and stirred, followed by pressurization to 1 kgf/cm$^2$ and temperature elevation to carry out the reaction at 200° C. for 10 hours. In such event, water produced as a reaction by-product was discharged from the autoclave. Upon termination of the reaction, excessively added phenol was distilled off under a reduced pressure to thereby finally obtain a solid product containing unreacted materials.

Then, 136 g of the solid product containing unreacted materials, 282 g of phenol, 400 g of toluene, and 0.92 g of zinc acetate were charged to the above autoclave and then stirred at room temperature. Thereafter, the mixture was heated to 100° C., and the reaction was carried out at atmospheric pressure for 10 hours. In such event, water produced as a reaction by-product was discharged from the autoclave. Upon termination of the reaction, the reaction mixture was cooled to room temperature and separated by solid-liquid separation using a filter. Then, toluene was removed from the separated toluene solution using a rotary evaporator, and the crude solid product thus obtained was purified by recrystallization. Thereafter, it was dried under vacuum at 70° C. for 18 hours to obtain biobased DPCD (yield: 42%).

Preparation Example 9: Synthesis of Biobased DPCD Using Biobased DMCD

The procedures of Preparation Example 8 were repeated to obtain a solid product containing unreacted materials, except that a 1-liter autoclave equipped with a 4-blade agitator, a cooling condenser, and a thermometer was charged with 100 g (0.51 mol) of biobased DMCD (Preparation Example 3), 480 g (5.10 mol) of phenol, and 1.72 g (0.01 mol) of p-toluenesulfonic acid.

Then, 140 g of the solid product containing unreacted materials, 240 g of phenol, 400 g of toluene, and 0.86 g of p-toluenesulfonic acid were charged to the above autoclave and then stirred at room temperature. Thereafter, the mixture was heated to 100° C., and the reaction was carried out at atmospheric pressure for 10 hours. In such event, methanol produced as a reaction by-product was discharged from the autoclave. Upon termination of the reaction, the reaction mixture was cooled to room temperature and separated by solid-liquid separation using a filter. Then, toluene was removed from the separated toluene solution using a rotary evaporator, and the crude solid product thus obtained was purified by recrystallization. Thereafter, it was dried under vacuum at 70° C. for 18 hours to obtain biobased DPCD (yield: 65%).

Preparation of a Compound Represented by Formula 6

Preparation Example 10: Synthesis of Biobased DPT Using Biobased TPA

A 1-liter round-bottom flask equipped with a 4-blade agitator, inlets for phosgene and nitrogen gas, an outlet for discharged gas, and a thermometer was charged with 100 g (0.60 mol) of biobased TPA (Preparation Example 1) and 200 g of toluene. The mixture was stirred at room temperature. 1.28 mol of phosgene gas was fed to the flask at atmospheric pressure for 10 hours to carry out the reaction. Thereafter, nitrogen gas was fed to the flask for 2 hours to remove the residual phosgene and hydrochloric acid gas produced as a by-product, thereby yielding a transparent and homogeneous reaction solution.

Then, 50% by weight of toluene initially supplied was distilled off from the reaction solution under a reduced pressure. Thereafter, a phenol solution in which 121 g (1.28 mol) of phenol had been dissolved in 121 g of toluene was added through a dropping funnel to the reaction solution for 2 hours. The mixture was stirred for 1 hour. Upon termination of the reaction, toluene was distilled off from the reaction solution under a reduced pressure to obtain a crude solid product. The solid product was purified by recrystallization and dried under vacuum at 80° C. for 12 hours to obtain biobased DPT (yield: 85%). The biobased carbon content of the biobased DPT was 89%.

Preparation Example 11: Synthesis of Biobased DPT Using Biobased TPA

The procedures of Preparation Example 10 were repeated to prepare biobased DPT (yield: 84%), except that 1.27 g (0.017 mol) of dimethylformamide was employed as an organic catalyst. The biobased carbon content of the biobased DPT was 88%.

Preparation Example 12: Synthesis of Biobased DPT Using Biobased DMT

A 1-liter round-bottom flask equipped with a 4-blade agitator, inlets for phosgene and nitrogen gas, an outlet for discharged gas, and a thermometer was charged with 100 g (0.51 mol) of biobased DMT (Preparation Example 2), 2.0 g (0.015 mol) of aluminum chloride, and 200 g of toluene. The mixture was stirred at room temperature. 1.10 mol of phosgene gas was fed to the flask at atmospheric pressure for 10 hours to carry out the reaction. Thereafter, nitrogen gas was fed to the flask for 2 hours to remove the residual phosgene and hydrochloric acid gas produced as a by-product, thereby yielding a transparent and homogeneous reaction solution.

Then, 50% by weight of toluene initially supplied was distilled off from the reaction solution under a reduced pressure. Thereafter, a phenol solution in which 100 g (1.06 mol) of phenol had been dissolved in 100 g of toluene was added through a dropping funnel to the reaction solution for 2 hours. The mixture was stirred for 1 hour. Upon termination of the reaction, toluene was distilled off from the reaction solution under a reduced pressure to obtain a crude solid product. The solid product was purified by recrystallization and dried under vacuum at 80° C. for 12 hours to obtain biobased DPT (yield: 87%). The biobased carbon content of the biobased DPT was 90%.

Preparation Example 13: Synthesis of Biobased DPT Using Biobased TPA

A 1-liter autoclave equipped with a 4-blade agitator, a cooling condenser, and a thermometer was charged with 100 g (0.6 mol) of biobased TPA (Preparation Example 1), 565 g (6 mol) of phenol, and 1.83 g (0.01 mol) of zinc acetate $(Zn(OAc)_2)$ as a catalyst. Then, the mixture was heated to 100° C. and stirred, followed by pressurization to 1 kgf/cm$^2$ and temperature elevation to carry out the reaction at 200° C. for 10 hours. In such event, water produced as a reaction by-product was discharged from the autoclave. Upon termination of the reaction, excessively added phenol was distilled off under a reduced pressure to thereby finally obtain a solid product containing unreacted materials.

Then, 136 g of the solid product containing unreacted materials, 282 g of phenol, 400 g of toluene, and 0.92 g of zinc acetate were charged to the above autoclave and then stirred at room temperature. Thereafter, the mixture was heated to 100° C., and the reaction was carried out at atmospheric pressure for 10 hours. In such event, water produced as a reaction by-product was discharged from the autoclave. Upon termination of the reaction, the reaction mixture was cooled to room temperature and separated by solid-liquid separation using a filter. Then, toluene was removed from the separated toluene solution using a rotary evaporator, and the crude solid product thus obtained was purified by recrystallization. Thereafter, it was dried under vacuum at 80° C. for 12 hours to obtain biobased DPT (yield: 42%).

Preparation Example 14: Synthesis of Biobased DPT Using Biobased DMT

The procedures of Preparation Example 13 were repeated to obtain a solid product containing unreacted materials, except that a 1-liter autoclave equipped with a 4-blade agitator, a cooling condenser, and a thermometer was charged with 100 g (0.51 mol) of biobased DMT (Preparation Example 2), 480 g (5.10 mol) of phenol, and 1.72 g (0.01 mol) of p-toluenesulfonic acid.

Then, 140 g of the solid product containing unreacted materials, 240 g of phenol, 400 g of toluene, and 0.86 g of p-toluenesulfonic acid were charged to the above autoclave and then stirred at room temperature. Thereafter, the mixture was heated to 100° C., and the reaction was carried out at atmospheric pressure for 10 hours. In such event, methanol produced as a reaction by-product was discharged from the autoclave. Upon termination of the reaction, the reaction mixture was cooled to room temperature and separated by solid-liquid separation using a filter. Then, toluene was removed from the separated toluene solution using a rotary evaporator, and the crude solid product thus obtained was purified by recrystallization. Thereafter, it was dried under vacuum at 80° C. for 12 hours to obtain biobased DPT (yield: 65%).

Preparation of an Additional Diol Compound

Preparation Example 15: Synthesis of Biobased CHDM

A fixed-bed continuous reactor was charged with a tablet catalyst of copper chromium (CuCr). The biobased DMCD obtained in Preparation Example 3 was supplied to the upper region of the reactor at a rate of 120 liter/h, along with hydrogen gas at a rate of 10 cm/s, and the ester reduction hydrogenation reaction was carried out at a reaction pressure of 220 kgf/cm$^2$. The reaction temperature was maintained at 230° C. to 240° C. in the upper region of the reactor, 135° C. to 145° C. in the intermediate region of the reactor, and 225° C. to 235° C. in the lower region of the reactor, respectively, and the maximum temperature difference in the reactor was within 20° C. After the reaction for a period of 5 to 10 hours, a crude liquid product was obtained from the lower region of the reactor. The liquid product was subjected to vacuum distillation to obtain biobased CHDM. The biobased carbon content of the biobased CHDM was 83%.

[Example] Preparation of a Highly Biobased Polycarbonate Ester

Example 1

A 17-liter bench-scale reactor for polycondensation was charged with 2,002 g (13.70 mol) of isosorbide (ISB; Roquette Freres), 444 g (1.37 mol) of biobased DPCD (Preparation Example 5), 2,641 g (12.33 mol) of DPC (Changfeng), and 2 g of a 1% aqueous solution of sodium aluminate (NaAlO$_2$). The mixture was heated to 150° C. Once the temperature reached 150° C., the pressure was reduced to 400 Torr, and the temperature was then elevated to 190° C. over 1 hour. At that time, phenol as a by-product of the polymerization reaction performed was discharged from the reactor. When the temperature reached 190° C., the pressure was reduced to 100 Torr and maintained for 20 minutes, and then the temperature was elevated to 230° C. over 20 minutes. Once the temperature reached 230° C., the pressure was reduced to 10 Torr, and then the temperature was elevated to 250° C. over 10 minutes. The pressure was reduced to 1 Torr or less at 250° C., and the reaction continued until the target stirring torque was reached. Upon arrival at the target stirring torque, the reaction was terminated. The polymerized product was pressurized to be discharged as a strand, which was rapidly cooled in a water bath and then cut into pellets. The polycarbonate ester thus prepared had a glass transition temperature (Tg) of 160° C., an intrinsic viscosity (IV) of 0.56 dl/g, and a biobased carbon content of 88%.

Example 2

A polycarbonate ester was prepared in the same manner as in Example 1, except that 2,002 g (13.70 mol) of ISB, 889 g (2.74 mol) of biobased DPCD (Preparation Example 5), and 2,348 g (10.96 mol) of DPC were used.

Example 3

A polycarbonate ester was prepared in the same manner as in Example 1, except that 2,002 g (13.70 mol) of ISB and 4,444 g (13.70 mol) of biobased DPCD (Preparation Example 5) were used.

Example 4

A polycarbonate ester was prepared in the same manner as in Example 1, except that 2,002 g (13.70 mol) of ISB, 2,641 g (12.33 mol) of DPC, and 436 g (1.37 mol) of biobased DPT (Preparation Example 10) were used.

Example 5

A polycarbonate ester was prepared in the same manner as in Example 1, except that 2,002 g (13.70 mol) of ISB, 2,348 g (10.96 mol) of DPC, 444 g (1.37 mol) of biobased DPCD (Preparation Example 5), and 436 g (1.37 mol) of biobased DPT (Preparation Example 10) were used.

Example 6

A polycarbonate ester was prepared in the same manner as in Example 1, except that 2,002 g (13.70 mol) of ISB, 198 g (1.37 mol) of biobased CHDM (Preparation Example 15), 2,641 g (12.33 mol) of DPC, and 444 g (1.37 mol) of biobased DPCD (Preparation Example 5) were used.

[Comparative Example] Preparation of a Biobased Polycarbonate Ester

Comparative Example 1

A 17-liter bench-scale reactor for polycondensation was charged with 2,002 g (13.70 mol) of ISB, 2,641 g (12.33 mol) of DPC, 444 g (1.37 mol) of DPCD (SK Chemicals), and 2 g of a 1% aqueous solution of $NaAlO_2$. The mixture was heated to 150° C. Once the temperature reached 150° C., the pressure was reduced to 400 Torr, and the temperature was then elevated to 190° C. over 1 hour. During the temperature elevation, phenol began to be discharged as a by-product of the polymerization reaction. When the temperature reached 190° C., the pressure was reduced to 100 Torr and maintained for 20 minutes, and then the temperature was elevated to 230° C. over 20 minutes. Once the temperature reached 230° C., the pressure was reduced to 10 Torr, and then the temperature was elevated to 250° C. over 10 minutes. The pressure was reduced to 1 Torr or less at 250° C., and the reaction continued until the target stirring torque was reached. Upon arrival at the target stirring torque, the reaction was terminated. The polymerized product pressurized and discharged was rapidly cooled in a water bath and then cut into pellets. The polycarbonate ester thus prepared had a Tg of 160° C., an IV of 0.55 dl/g, and a biobased carbon content of 77%.

Comparative Example 2

A polycarbonate ester resin was prepared in the same manner as in Comparative Example 1, except that 1,802 g (12.33 mol) of ISB, 198 g (1.37 mol) of CHDM (SK Chemicals), 444 g (1.37 mol) of DPCD, and 2,641 g (12.33 mol) of DPC were used.

Evaluation Example

The highly biobased polycarbonate esters of Examples 1 to 6 and the biobased polycarbonate esters of Comparative Examples 1 and 2 were each evaluated for their physical properties by the following methods. The measured physical properties are shown in Table 1 below.
(1) Glass Transition Temperature (Tg)
The glass transition temperature was measured using a differential scanning calorimeter (Q20, TA Instruments) in accordance with ASTM D3418.
(2) Intrinsic Viscosity (IV)
A sample was dissolved in o-chlorophenol at a concentration of 1.2 g/dl at 150° C. for 15 minutes. The intrinsic viscosity of the sample was measured in a thermostat at 35° C. using an Ubbelodhe viscometer.
(3) Light Transmittance
The light transmittance (%) was measured using a spectrophotometer (CM-3600A, Konica Minolta) in accordance with ASTM D1003.
(4) Pencil Hardness
A specimen prepared according to KS M ISO15184 was subjected to the measurement for pencil hardness using a pencil hardness testing machine (VF2377-123, TQC).
(5) Static Electricity
A specimen having a size of 30 mm×30 mm×3 mm (width×length×thickness) was molded using an injection molding machine (12M, BOY), and the surface static voltage was measured with a portable static electricity meter.
(6) Biobased Carbon Content
The biobased carbon content (%) was measured using an accelerator mass spectroscopy (Beta Analytic Co.) according to ASTM D6866-16.

TABLE 1

| | | Ex. 1 | Ex. 2 | Ex. 3 | Ex. 4 | Ex. 5 | Ex. 6 | C. Ex. 1 | C. Ex. 2 |
|---|---|---|---|---|---|---|---|---|---|
| Comp. | ISB | 1 | 1 | 1 | 1 | 1 | 0.9 | 1 | 0.9 |
| | CHDM | — | — | — | — | — | 0.1 | — | 0.1 |
| | DPC | 0.9 | 0.8 | — | 0.9 | 0.8 | 0.9 | 0.9 | 0.9 |
| | DPCD | 0.1 | 0.2 | 1 | — | 0.1 | 0.1 | 0.1 | 0.1 |
| | DPT | — | — | — | 0.1 | 0.1 | — | — | — |
| Physical property | Tg (° C.) | 160 | 157 | 132 | 170 | 168 | 150 | 160 | 150 |
| | IV (dl/g) | 0.56 | 0.55 | 0.57 | 0.54 | 0.53 | 0.58 | 0.55 | 0.56 |
| | Mn | 17,632 | 16,985 | 18,582 | 16,166 | 15,672 | 19,235 | 17,309 | 18,012 |
| | Mw | 37,048 | 35,963 | 39,191 | 35,083 | 32,598 | 40,225 | 36,368 | 38,495 |
| | Mw/Mn | 2.10 | 2.12 | 2.11 | 2.17 | 2.08 | 2.09 | 2.10 | 2.14 |
| | Transmittance (%) | 92 | 92 | 91 | 92 | 92 | 92 | 92 | 92 |
| | Pencil hardness | 2H | H | H | 2H | H | H | 2H | H |

TABLE 1-continued

|  | Ex. 1 | Ex. 2 | Ex. 3 | Ex. 4 | Ex. 5 | Ex. 6 | C. Ex. 1 | C. Ex. 2 |
|---|---|---|---|---|---|---|---|---|
| Static electricity | 0.7 | 0.7 | 0.6 | 0.7 | 0.7 | 0.7 | 1.0 | 1.3 |
| Biobased carbon content | 88 | 91 | 98 | 89 | 90 | 91 | 77 | 50 |

As shown in Table 1 above, the highly biobased polycarbonate esters of Examples 1 to 6, copolymerized using the biobased DPCD (Formula 5), DPT (Formula 6), and CHDM (Formula 8) prepared according to the preparation process of the present invention, had a high biobased carbon content as compared with the biobased polycarbonate esters, copolymerized using the conventional petroleum-based DPCD, DPT, CHDM and DPC. Thus, they can be more suitably used in the field of environmentally friendly materials.

In particular, when the content of repeat units of DPCD and/or DPT as biobased monomers increased, the content of a repeat unit of DPC as a petroleum-based monomer decreased, resulting in an increase in the biobased carbon content.

In addition, as the biobased carbon content increased, the effect that the electrostatic voltage generated in the injection molded article was reduced was confirmed. Accordingly, since the highly biobased polycarbonate ester hardly generates static electricity during injection molding, it is possible to improve the defect rate caused by the adhesion of dust and foreign matters in the air.

In addition, the light transmittance values in Examples 1 to 6 were all 91% or more, and the pencil hardness values were H or higher, which are superior to the light transmittance of 90% and the pencil hardness of B of the BPA-based polycarbonate products.

Meanwhile, the biobased polycarbonate esters of Comparative Examples 1 and 2, prepared by using petroleum-based monomers excluding ISB, had molecular weight, glass transition temperature, light transmittance, and pencil hardness, equivalent to those of Examples 1 to 6, prepared by using biobased monomers excluding DPC. However, they had a relatively low biobased carbon content, which was disadvantageous from the viewpoint of environmental friendliness.

Accordingly, the content of biobased monomers may be adjusted to control the biobased carbon content obtained from each repeat unit, and the highly biobased polycarbonate ester produced accordingly can be advantageously used for various environmentally friendly applications while maintaining the advantages of the conventional biobased polycarbonate esters.

The invention claimed is:

1. A highly biobased polycarbonate ester, which comprises:
    a repeat unit represented by the following Formula 2, and
    at least one selected from the group consisting of a repeat unit 1 represented by the following Formula 1 and a repeat unit 3 represented by the following Formula 3,
    wherein the biobased carbon content derived from biomass according to ASTM D6866 is 80% or more:

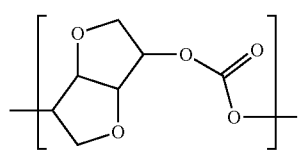

[Formula 1]

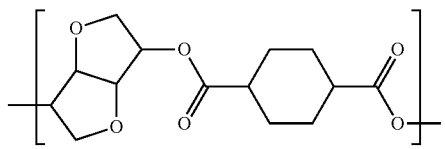

[Formula 2]

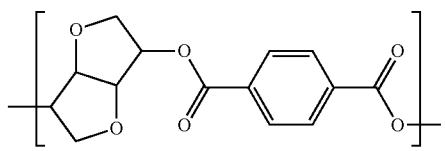

[Formula 3]

2. The highly biobased polycarbonate ester of claim 1, wherein the repeat unit 1 is obtained from the reaction of 1,4:3,6-dianhydrohexitol and a carbonate, the repeat unit 2 is obtained from the reaction of 1,4:3,6-dianhydrohexitol and a 1,4-cyclohexanedicarboxylate, and the repeat unit 3 is obtained from the reaction of 1,4:3,6-dianhydrohexitol and a terephthalate.

3. The highly biobased polycarbonate ester of claim 2, wherein the 1,4-cyclohexanedicarboxylate and terephthalate are biobased monomers derived from at least one selected from the group consisting of sugar, limonene, and lignin.

4. The highly biobased polycarbonate ester of claim 1, which comprises the repeat unit 1 represented by the above Formula 1, the repeat unit 2 represented by the above Formula 2, and the repeat unit 3 represented by the above Formula 3.

5. The highly biobased polycarbonate ester of claim 1, which has a glass transition temperature of 100 to 260° C.

6. The highly biobased polycarbonate ester of claim 1, which further comprises a repeat unit obtained by using an additional diol compound other than 1,4:3,6-dianhydrohexitol.

7. The highly biobased polycarbonate ester of claim 6, wherein the additional diol compound is at least one diol compound selected from the group consisting of ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,15-pentadecanediol, 1,16-hexadecanediol, triethylene glycol, tetraethylene glycol, pentaethylene glycol, hexaethylene glycol, heptaethylene glycol, octaethylene glycol, nonaethylene glycol, decaethylene glycol, undecaethylene glycol, dodecaethylene glycol, 1,2-cyclohexanedimethanol, 1,3-cyclohexanedimethanol, 1,4-cyclohexanedimethanol, tricyclodecane dimethanol, pentacyclopentadecanedimethanol, decalindimethanol, tricyclotetradecanedimethanol, norbornanedimethanol, adamantanedimethanol, 3,9-bis(1,1-dimethyl-2-hydroxyethyl)-2,4,8,10-tetraoxaspiro [5,5] undecane, bicyclo [2.2.2] octane-2,3-dimethanol, 1,2-cyclohexanediol, 1,3-cyclohexanediol, 1,4-cyclohexanediol, 2-methyl-1,4-cyclohexanediol, tricyclodecanediol, pentacyclopentadecanediol, decalindiol, tricyclotetradecanediol, norbornanediol, adamantanediol, 2,2-bis(4-hydroxycyclohexyl) propane, 2,2,4,4-tetramethyl-1,3-cyclobutanediol, hydroquinone, biphenol, 2,2-bis(4-hydroxyphenyl) propane, 2,2-bis(4-hydroxy-3,5-dimethylphenyl) propane, 2,2-bis(4-hydroxy-3,5-diethylphenyl) propane, 1,1-bis(4-hydroxyphenyl)-1-phenyl-ethane, 1,1-bis(4-hydroxyphenyl)cyclohexane, 1,1-bis(4-hydroxyphenyl)-3,3,5-trimethylcyclohexane, 5,5'-(1-methylethyliden)-bis [1,1'-(bisphenyl)-2-ol] propane, 1,4-bis [2-(4-hydroxyphenyl)-2-propyl] benzene, bis(4-hydroxyphenyl) sulfone, 1,3-bis [2-(4-hydroxyphenyl)-2-propyl] benzene, 2,2-bis(4-hydroxy-3-isopropyl-phenyl) propane, bis(4-hydroxyphenyl) methane, 1,1-bis(4-hydroxyphenyl) ethane, bis(4-hydroxyphenyl)-2,2-dichloroethylene, 2,2-bis(3-methyl-4-hydroxyphenyl) propane, bis(4-hydroxyphenyl)diphenylmethane, 2,2-bis(4-hydroxyphenyl) butane, 2,2-bis(4-hydroxyphenyl) hexafluoropropane, 3,3'-spiro-bis(1,1-dimethyl-2,3-dihydro-1H-inden-5-ol), dispiro [5.1.5.1] tetradecane-7,14-diol, 5,5'-(1-methylethylidene)bis(2-furanmethanol), 2,4:3,5-di-o-methylene-D-mannitol, and tetrahydrofuran-2,5-dimethanol.

8. The highly biobased polycarbonate ester of claim 6, wherein the additional diol compound is a biobased monomer derived from at least one selected from the group consisting of sugar, limonene, and lignin.

9. The highly biobased polycarbonate ester of claim 2, which further comprises a repeat unit obtained by using an additional diphenyl ester compound other than the carbonate, 1,4-cyclohexanedicarboxylate, and terephthalate.

10. The highly biobased polycarbonate ester of claim 9, wherein the additional diphenyl ester compound is at least one selected from the group consisting of diphenyl oxalate, diphenyl malonate, diphenyl succinate, diphenyl glutarate, diphenyl adipate, diphenyl pimelate, diphenyl suberate, diphenyl azelate, diphenyl sebacate, diphenyl undecanedioate, diphenyl dodecanedioate, diphenyl tridecanedioate, diphenyl tetradecanedioate, diphenyl pentadecanedioate, diphenyl hexadecanedioate, 1,2-diphenyl-cyclohexanedicarboxylate, 1,3-diphenyl-cyclohexanedicarboxylate, diphenyl decahydronaphthalene-2,4-dicarboxylate, diphenyl decahydronaphthalene-2,5-dicarboxylate, diphenyl decahydronaphthalene-2,6-dicarboxylate, diphenyl decahydronaphthalene-2,7-dicarboxylate, diphenyl tetrahydrofuran-2,5-dicarboxylate, diphenyl isophthalate, 4,4'-diphenyl-biphenyldicarboxylate, 4,4'-diphenyl-ethylidenebisbenzoate, 4,4'-diphenyl-oxybisbenzoate, 2,4-diphenyl-naphthalenedicarboxylate, 2,5-diphenyl-naphthalenedicarboxylate, 2,6-diphenyl-naphthalenedicarboxylate, 2,7-diphenyl-naphthalenedicarboxylate, and 2,5-diphenyl-furandicarboxylate.

11. The highly biobased polycarbonate ester of claim 9, wherein the additional diphenyl ester compound is a biobased monomer derived from at least one selected from the group consisting of sugar, limonene, and lignin.

12. A process for preparing the highly biobased polycarbonate ester of claim 1, which comprises:
melt-polycondensing at least one compound selected from the group consisting of:
a compound represented by the following Formula 4,
a compound represented by the following Formula 5, and
a compound represented by the following Formula 6
with 1,4:3,6-dianhydrohexitol:

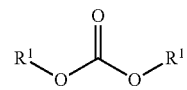

[Formula 4]

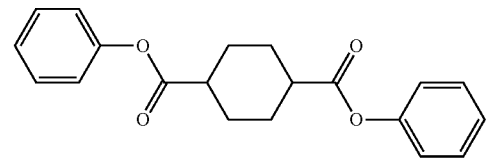

[Formula 5]

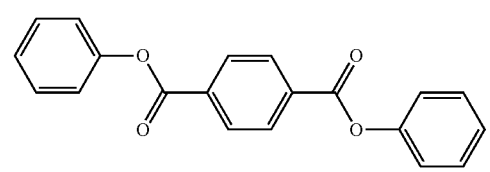

[Formula 6]

in the above Formulae, $R^1$ is each an alkyl group having 1 to 18 carbon atoms or an aryl group having 6 to 18 carbon atoms, wherein the aryl group may have at least one substituent selected from the group consisting of an alkyl group having 1 to 18 carbon atoms, a cycloalkyl group having 4 to 20 carbon atoms, an aryl group having 6 to 18 carbon atoms, an alkoxy group having 1 to 18 carbon atoms, a cycloalkoxy group having 4 to 20 carbon atoms, an aryloxy group having 6 to 18 carbon atoms, an alkylsulfonyl group having 1 to 18 carbon atoms, a cycloalkylsulfonyl group having 4 to 20 carbon atoms, an arylsulfonyl group having 6 to 18 carbon atoms, and an ester substituent.

13. The process for preparing the highly biobased polycarbonate ester of claim 12, wherein the compound of the above Formula 5 and the compound of the above Formula 6 are biobased monomers derived from at least one selected from the group consisting of sugar, limonene, and lignin.

14. The process for preparing the highly biobased polycarbonate ester of claim 12, wherein the compound represented by the above Formula 5 is obtained by reacting a compound represented by the following Formula 5' with a halogen-containing compound to convert the compound represented by the following Formula 5' into an intermediate reactant containing a halogen functional group at the terminal, followed by subjecting the intermediate reactant it to a nucleophilic reaction with phenol or a phenol substituent, or
by an esterification or transesterification reaction of a compound represented by the following Formula 5' with phenol or a phenol substituent:

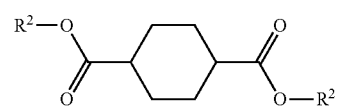

[Formula 5']

in the above Formula, $R^2$ is each independently hydrogen or methyl.

15. The process for preparing the highly biobased polycarbonate ester of claim 14, wherein the intermediate reactant containing a halogen functional group at the terminal is a compound represented by the following Formula 5":

[Formula 5"]

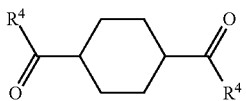

in the above Formula, $R^4$ is each independently F, Cl, or Br.

16. The process for preparing the highly biobased polycarbonate ester of claim 12, wherein the compound represented by the above Formula 6 is obtained by reacting a compound represented by the following Formula 6' with a halogen-containing compound to convert the compound represented by the following Formula 6' into an intermediate reactant containing a halogen functional group at the terminal, followed by subjecting the intermediate reactant to a nucleophilic reaction with phenol or a phenol substituent, or
by an esterification or transesterification reaction of a compound represented by the following Formula 6' with phenol or a phenol substituent:

[Formula 6']

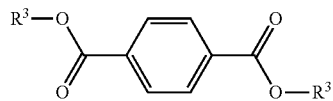

in the above Formula, $R^3$ is each independently hydrogen or methyl.

17. The process for preparing the highly biobased polycarbonate ester of claim 16,
wherein the intermediate reactant containing a halogen functional group at the terminal is a compound represented by the following Formula 6":

[Formula 6"]

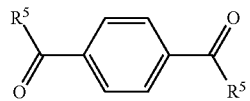

in the above Formula, $R^5$ is each independently F, Cl, or Br.

18. The process for preparing the highly biobased polycarbonate ester of claim 14, wherein the halogen-containing compound is at least one selected from the group consisting of phosgene, triphosgene, thionyl chloride, oxalyl chloride, phosphorus trichloride, phosphorus pentachloride, phosphorus pentabromide, and cyanuric fluoride,
wherein the conversion to the intermediate reactant is carried out at atmospheric pressure at a temperature of −30 to 150° C. for 5 minutes to 48 hours; and/or
wherein the esterification or transesterification reaction is carried out at 20 to 300° C.

19. The process for preparing the highly biobased polycarbonate ester of claim 12, wherein the compound represented by the above Formula 4 is diphenyl carbonate or substituted diphenyl carbonate.

20. The process for preparing a highly biobased polycarbonate ester of claim 12, wherein the melt-polycondensation reaction comprises (1) a first reaction at a reduced pressure of 50 to 700 Torr and at a temperature of 130 to 250° C. for 0.1 to 10 hours; and (2) a second reaction at a reduced pressure of 0.1 to 20 Torr and at a temperature of 200 to 350° C. for 0.1 to 10 hours.

21. A molded article prepared from the highly biobased polycarbonate ester of claim 1.

22. The process for preparing the highly biobased polycarbonate ester of claim 16, wherein the halogen-containing compound is at least one selected from the group consisting of phosgene, triphosgene, thionyl chloride, oxalyl chloride, phosphorus trichloride, phosphorus pentachloride, phosphorus pentabromide, and cyanuric fluoride,
wherein the conversion to the intermediate reactant is carried out at atmospheric pressure at a temperature of −30 to 150° C. for 5 minutes to 48 hours; and/or
wherein the esterification or transesterification reaction is carried out at 20 to 300° C.

* * * * *